(12) United States Patent
Lee et al.

(10) Patent No.: US 12,172,486 B2
(45) Date of Patent: Dec. 24, 2024

(54) REAR SIDE MEMBER OF VEHICLE

(71) Applicants: Hyundai Motor Company, Seoul (KR); Kia Corporation, Seoul (KR)

(72) Inventors: Seung Hak Lee, Asan-si (KR); Mi Ran Park, Hwaseong-si (KR); Won Hae Lee, Seoul (KR); Ha Yeon Kwon, Seoul (KR); Byung Joo Chung, Gunpo-si (KR); Nam Ho Kim, Gwangmyeong-si (KR); Min Seok Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 48 days.

(21) Appl. No.: 18/178,023

(22) Filed: Mar. 3, 2023

(65) Prior Publication Data
US 2024/0166013 A1    May 23, 2024

(30) Foreign Application Priority Data
Nov. 17, 2022   (KR) .................... 10-2022-0154868

(51) Int. Cl.
*B60G 21/05*   (2006.01)
*B60G 11/50*   (2006.01)

(52) U.S. Cl.
CPC ............ *B60G 21/051* (2013.01); *B60G 11/50* (2013.01); *B60G 2200/141* (2013.01); *B60G 2202/12* (2013.01); *B60G 2202/136* (2013.01); *B60G 2206/20* (2013.01)

(58) Field of Classification Search
CPC .. B60G 21/051; B60G 11/50; B60G 2206/20; B60G 2200/141; B60G 2202/136; B60G 2202/1362; B60G 2206/201
USPC .................................. 280/124.128, 124.126
See application file for complete search history.

(56) References Cited

U.S. PATENT DOCUMENTS

| 6,047,978  | A    |   | 4/2000  | Watanabe et al. |            |
|------------|------|---|---------|---------|------------|
| 6,109,630  | A    | * | 8/2000  | Dazy ........................ | B60G 7/00 |
|            |      |   |         |         | 280/124.156 |
| 6,527,286  | B2   | * | 3/2003  | Keeler ..................... | B60G 9/00 |
|            |      |   |         |         | 280/124.135 |
| 8,308,175  | B2   | * | 11/2012 | Choi ..................... | B60G 21/051 |
|            |      |   |         |         | 280/124.152 |
| 9,533,711  | B2   | * | 1/2017  | Hirsch ................... | B62D 21/02 |

(Continued)

FOREIGN PATENT DOCUMENTS

| CN | 115123390 A | * | 9/2022 | ........... B60G 21/052 |
| JP | H0858329 A  |   | 3/1996 | |

(Continued)

*Primary Examiner* — Paul N Dickson
*Assistant Examiner* — Caitlin Anne Miller
(74) *Attorney, Agent, or Firm* — SLATER MATSIL, LLP

(57) ABSTRACT

An embodiment rear side member of a vehicle includes a front portion extending forward in a vehicle length direction, a rear portion extending rearward in the vehicle length direction and disposed offset to an inside of the vehicle with respect to the front portion, and a transition portion in a curved shape connecting a rear end of the front portion and a front end of the rear portion and passing through both a first point configured to engage with a first arm of a first type suspension and a second point configured to engage with a second arm of a second type suspension different from the first type suspension.

19 Claims, 4 Drawing Sheets

(56) References Cited

U.S. PATENT DOCUMENTS

| | | | |
|---|---|---|---|
| 9,663,145 B2* | 5/2017 | Schroeder | B60G 3/20 |
| 10,189,502 B2* | 1/2019 | Shi | B62D 21/14 |
| 11,377,152 B2* | 7/2022 | Ota | B60G 9/04 |
| 11,634,002 B2* | 4/2023 | Noh | B62D 21/02 |
| | | | 280/124.128 |
| 11,702,162 B2* | 7/2023 | Harmon | B60K 1/00 |
| | | | 296/193.04 |
| 11,827,067 B1* | 11/2023 | Jung | B60G 21/051 |
| 11,884,330 B1* | 1/2024 | Lee | B62D 24/04 |
| 2007/0108714 A1 | 5/2007 | Kim et al. | |
| 2010/0032920 A1* | 2/2010 | Hong | B60G 21/0551 |
| | | | 280/124.109 |
| 2013/0056947 A1 | 3/2013 | Moon et al. | |
| 2014/0125025 A1 | 5/2014 | Lee et al. | |
| 2018/0105007 A1 | 4/2018 | Park | |
| 2023/0049765 A1* | 2/2023 | Lee | B60G 7/04 |
| 2024/0116348 A1* | 4/2024 | Jeong | B60K 1/04 |

FOREIGN PATENT DOCUMENTS

| | | |
|---|---|---|
| JP | H10236123 A | 9/1998 |
| JP | 2013052855 A | 3/2013 |
| KR | 102319822 B1 | 11/2021 |

\* cited by examiner

REAR SIDE MEMBER OF VEHICLE

CROSS-REFERENCE TO RELATED APPLICATIONS

This application claims the benefit of Korean Patent Application No. 10-2022-0154868, filed on Nov. 17, 2022, which application is hereby incorporated herein by reference.

TECHNICAL FIELD

The present disclosure relates to a rear side member of a vehicle.

BACKGROUND

A suspension is a device that connects wheels and a vehicle body and is widely applied to vehicles to absorb shocks from road surfaces and to secure tire grip.

Currently, various types of suspensions have been developed and applied to vehicles. Typical examples are a coupled torsion beam axle (CTBA) suspension and a wishbone suspension.

The CTBA suspension can cope with basic driving performance and is relatively inexpensive, while the wishbone suspension can cope with high-load vehicles and high-driving performance. Generally, different types of suspensions are applied to different types of vehicles.

Application of these suspensions to vehicles requires the corresponding configuration of chassis frames, and thus, the frame structures of the vehicles differ depending on the applied suspension type.

On the other hand, a purpose-built vehicle (PBV) consists of a life module that forms various types of boarding and loading spaces according to market needs and a drive module that relates to the actual driving of the vehicle. Various types of vehicles may be easily produced by coupling a certain drive module with life modules according to various needs, thereby allowing a highly effective response to market trends of high-mix low-volume production.

Such a PBV may serve various purposes, and the type of applied suspension may vary depending on the purpose of use, so it is necessary to present a frame structure that may apply to various types of suspensions.

The matters described as the background technology of the disclosure are only for a better understanding of the background of embodiments of the present disclosure and are not to be taken as an acknowledgment that the present disclosure pertains to the conventional art already known to those skilled in the art.

SUMMARY

The present disclosure relates to a rear side member of a vehicle. Particular embodiments relate to a rear side member of a vehicle having a shape that may engage with different types of suspensions.

An embodiment of the present disclosure provides a rear side member having a shape compatible with positions at which a plurality of types of suspensions are coupled to a vehicle body such that a common rear side member may apply to different types of suspensions, thereby improving the usefulness of the rear side member.

The embodiments of the present disclosure are not limited to the embodiments mentioned above, and other embodiments not mentioned will be clearly understood by those skilled in the art from the following description.

According to an embodiment of the present disclosure, the rear side member of the vehicle includes a front portion extending forward in the vehicle length direction, a rear portion extending rearward in the vehicle length direction and disposed offset to the inside of the vehicle with respect to the front portion, and a transition portion in a curved shape connecting a rear end of the front portion and a front end of the rear portion and passing through both a first point configured to engage with a first arm of a first type suspension and a second point configured to engage with a second arm of a second type suspension different from the first type suspension.

The front and rear portions may have a linear shape.

The transition portion may extend between the front portion and the rear portion, and one end connected to the rear end of the front portion and the other end connected to the front end of the rear portion may be bent.

The first type suspension and the first arm may be a CTBA suspension and a trailing arm respectively, and the second type suspension and the second arm may be a wishbone suspension and an upper arm respectively.

The first point may be located forward of the second point in the vehicle length direction.

The first point may be located outside of the second point in the vehicle width direction.

The second arm may engage with the top or bottom of the second point.

The second arm may have a wishbone shape.

The height difference between the front and rear portions may correspond to the height of a spring provided in the first type suspension.

The first type suspension may be a CTBA suspension, and a spring seat may be disposed at the bottom of the rear portion.

The first type suspension may include a shock absorber configured to engage with at least one of the top, bottom, and side of the rear portion.

The second type suspension may be a wishbone suspension and include a strut configured to engage with at least one of the top, bottom, and side of the rear portion.

A first bracket for engaging with the first arm may be assembled at the first point, and a second bracket for engaging with the second arm may be assembled at the second point.

The first type suspension may be a CTBA suspension and include a shock absorber, and a third bracket for engaging with the shock absorber may be assembled in the rear portion.

The second type suspension may be a wishbone suspension and include a lower arm and a strut, and a fourth bracket for engaging with the lower arm and a fifth bracket for engaging with the strut may be assembled in the rear portion.

According to the various embodiments of the present disclosure described above, the rear side member has a shape that may engage with different types of suspensions, thereby improving the usefulness of the side member.

Accordingly, the cost of producing side members for each suspension type may be reduced and other parts coupled with the side member such as joints that are coupled with the upper body may be standardized for application.

The effects obtainable from embodiments of the present disclosure are not limited to the effects mentioned above, and other effects not mentioned will be clearly understood by those skilled in the art from the following description.

DETAILED DESCRIPTION OF ILLUSTRATIVE EMBODIMENTS

Figure 1:
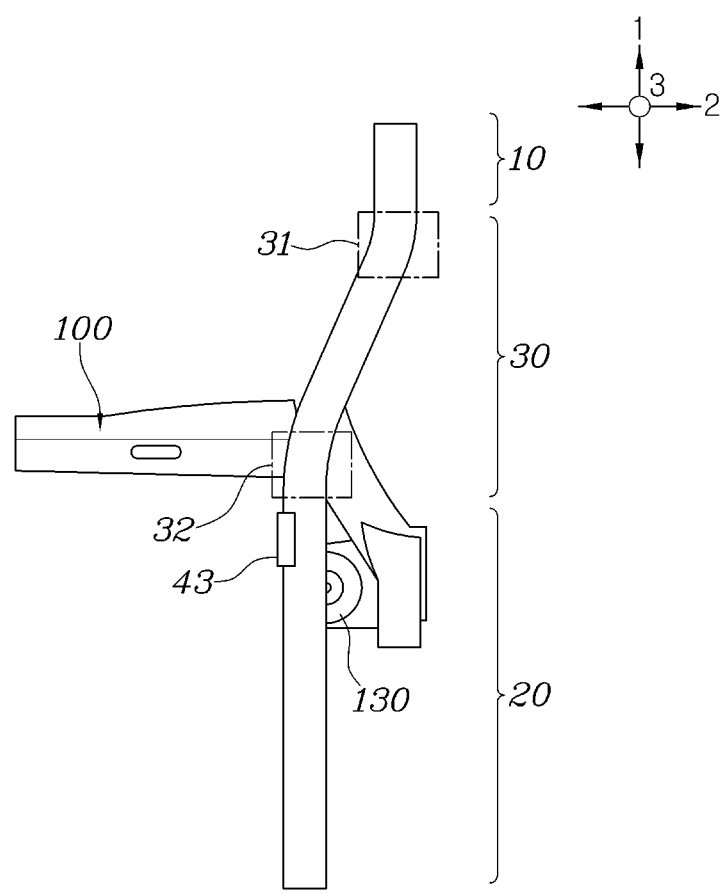
FIG. 1 is a plan view illustrating a rear side member of a vehicle applied to a coupled torsion beam axle (CTBA) suspension according to an embodiment of the present disclosure.

Specific structural or functional descriptions of embodiments of the present disclosure disclosed in the present specification or application are only presented for describing embodiments according to the present disclosure, and the embodiments according to the present disclosure may be implemented in various forms and are not to be construed as limited to the embodiments described in the present specification or application.

Since the embodiments according to the present disclosure may be subjected to various modifications and may have various forms, specific embodiments will be illustrated in the drawings and described in detail in the present specification or application. However, it is to be understood that the embodiments according to the concept of the present disclosure are not limited to the specific disclosed forms and include all modifications, equivalents, and substitutes included in the spirit and technical scope of the present disclosure.

Unless otherwise defined, all terms used herein, including technical or scientific terms, have the same meaning as what is generally understood by those skilled in the art to which the present disclosure pertains. Terms such as those defined in commonly used dictionaries are to be construed as having meanings consistent with the meanings in the context of the related art, and unless explicitly defined herein, are not to be construed as ideal and overly formal.

The embodiments disclosed herein will be described in detail with reference to the accompanying drawings. However, the same or similar components will be given the same reference numerals irrespective of the drawing numbers, and the repetitive descriptions will be omitted.

The suffixes "module" and "unit" for the components used in the following description are given or interchangeably used only in consideration of the ease of writing the specification and do not have meanings or roles distinct from each other by themselves.

When it is determined that the specific description of the related and already known technology may obscure the gist of the embodiments disclosed herein, the specific description will be omitted. Further, it is to be understood that the accompanying drawings are for a better understanding of the embodiments disclosed herein and that the technical ideas disclosed herein are not limited to the accompanying drawings and include all the modifications, equivalents, or substitutes included in the spirit and technical scope of the present disclosure.

The terms including ordinal numbers such as first, second, and the like may be used to describe various components, but the components are not to be limited by the terms. The terms may only be used for the purpose of distinguishing one component from the other.

It is to be understood that when a component is referred to as being "connected" or "coupled" to another component, the component may be directly connected or coupled to the other component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

Prior to describing a rear side member of a vehicle, it is to be noted that 'vehicle length direction' refers to a first axis direction in the drawing, 'vehicle width direction' is a second axis direction, and 'height direction' refers to a third axis direction.

First, the rear side member of the vehicle applied to the coupled torsion beam axle (CTBA) suspension will be described with reference to FIGS. 1 to 3.

Figure 2:
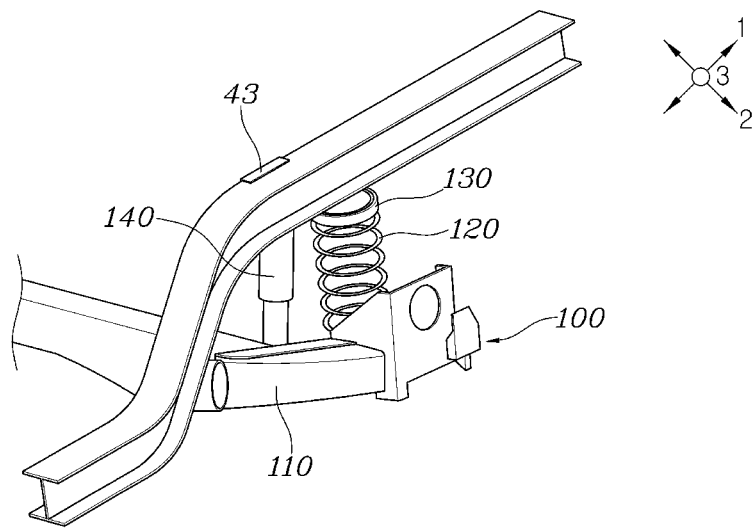
FIG. 2 is a perspective view illustrating a rear side member of a vehicle applied to a CTBA suspension according to an embodiment of the present disclosure.
Figure 3:
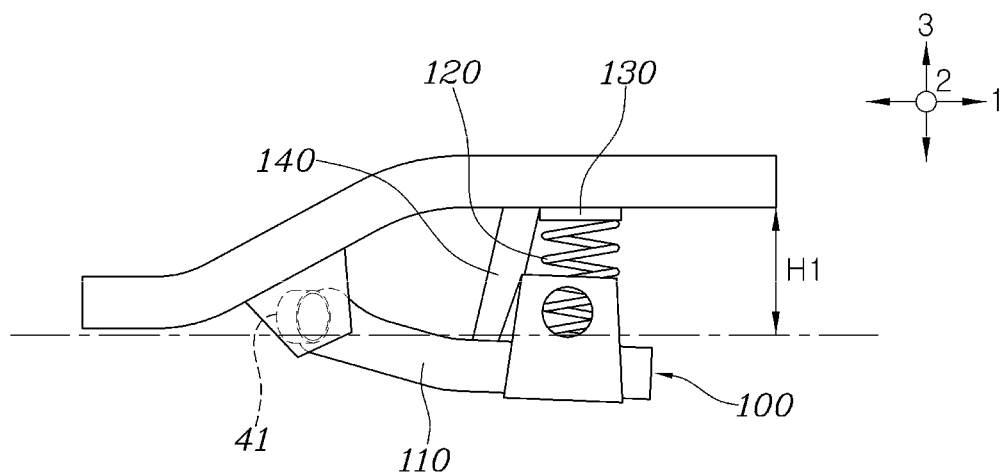
FIG. 3 is a side view illustrating a rear side member of a vehicle applied to a CTBA suspension according to an embodiment of the present disclosure.

FIG. 1 is a plan view illustrating the rear side member of the vehicle applied to the CTBA suspension according to an embodiment of the present disclosure, FIG. 2 is a perspective view illustrating the rear side member of the vehicle applied to the CTBA suspension according to the embodiment of the present disclosure, and FIG. 3 is a side view illustrating the rear side member of the vehicle applied to the CTBA suspension according to the embodiment of the present disclosure.

FIGS. 1 to 3 show that the rear side member of the vehicle according to the embodiment of the present disclosure may include a front portion 10, a rear portion 20, and a transition portion 30 and that a plurality of brackets 40 may be assembled. FIGS. 1 to 3 mainly show components relating to embodiments of the present disclosure, and the actual rear side member of a vehicle including more or fewer components may be implemented.

The rear side member forms a part of a side member and may be connected to the rear of a middle side member.

In addition, a pair of rear side members may be implemented to be symmetrically disposed in the vehicle width direction.

Each component will be described below.

First, the front portion 10 extends forward in the vehicle length direction, and the rear portion 20 extends rearward in the vehicle length direction and may be disposed offset to the inside of the vehicle with respect to the front portion.

The front portion 10 and the rear portion 20 may be formed in a linear shape, thereby providing rigidity in the vehicle length direction.

On the other hand, the transition portion 30 connects the rear end of the front portion 10 and the front end of the rear portion 20 and may be implemented in a curved shape passing through both a first point 31 configured to engage with a first arm no of a first type suspension 100 and a second point 32 configured to engage with a second arm 210 of a second type suspension 200 different from the first type suspension 100.

The transition portion 30 extends between the front portion 10 and the rear portion 20, and one end connected to the rear end of the front portion 10 and the other end connected to the front end of the rear portion 20 may be bent. Accordingly, the front portion 10 and the rear portion 20 disposed apart from each other may be smoothly connected to form an integral side member.

On the other hand, the first type suspension 100 may be a CTBA suspension.

In this case, the first arm no may be a trailing arm provided in the CTBA suspension. The trailing arm extends in the vehicle length direction and may engage with the rear side member to fix the suspension to the rear side member.

The first point 31 may be located forward of the second point 32 in the vehicle length direction. Accordingly, a rear side member that may engage with the first type suspension 100, of which the part engaging with the rear side member is formed forward of the part engaging with a wheel in the vehicle length direction like the CTBA suspension, may be provided.

In addition, the first point 31 may be located outside of the second point 32 in the vehicle width direction. Accordingly, the offset amount in the vehicle width direction between the part of the first type suspension 100 engaging with the rear side member and the part of the first type suspension 100 engaging with the wheel may be reduced. In this case, the first arm 110 of the first type suspension 100 may have a shape close to a straight line, thereby providing improved structural rigidity.

On the other hand, the height difference Hi between the front portion 10 and the rear portion 20 may correspond to the height of a spring 120 provided in the first type suspension 100. Accordingly, a space in which the spring 120 provided in the first type suspension 100 is to be disposed may be secured.

In addition, when the first type suspension 100 is a CTBA suspension, a spring seat 130 may be disposed at the bottom of the rear portion 20. The spring 120 is disposed at the bottom of the spring seat 130, and thus, the rear side member may be seated on top of the spring 120.

In addition, the first type suspension 100 may include a shock absorber 140 configured to engage with at least one of the top, bottom, and side of the rear portion 20. The shock absorber 140 is disposed in the height direction like the spring 120 and serves to absorb the shock applied to the vehicle.

On the other hand, a first bracket 41 for engaging the first arm 110, such as a trailing arm with the rear side member, may be assembled at the first point 31.

In addition, a third bracket 43 for engaging with the shock absorber 140 may be assembled in the rear portion 20.

The engagement is performed through the brackets 41, 43 while the rear side member is shaped to correspond to the coupling position with the first type suspension 100 so that constraints on the shape required for the rear side member to engage with different types of suspensions may be eased.

Application of the rear side member described above to the second type suspension 200 will be described using an example of a wishbone suspension with reference to FIGS. 4 to 6.

Figure 4:
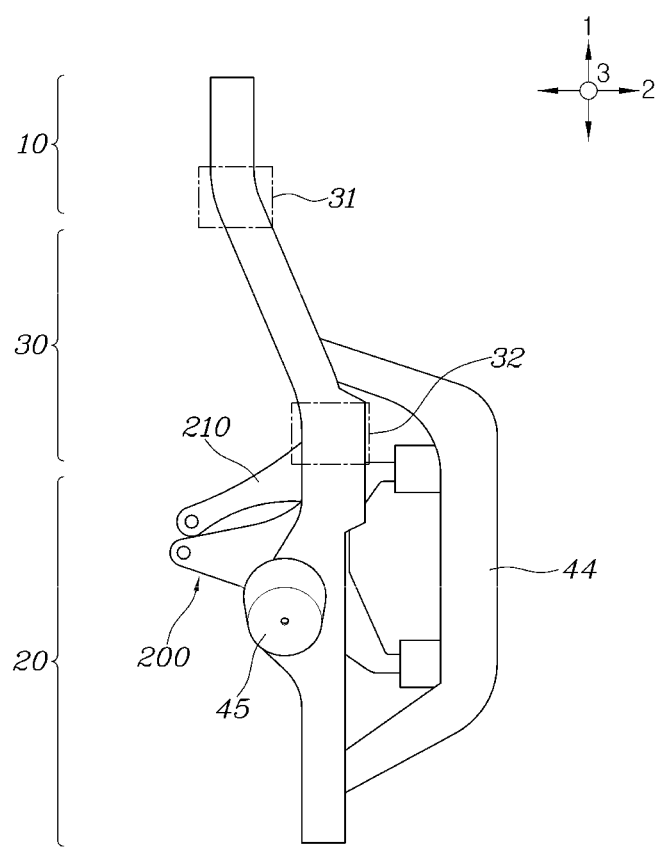
FIG. 4 is a plan view illustrating a rear side member of a vehicle applied to a wishbone suspension according to an embodiment of the present disclosure.
Figure 5:
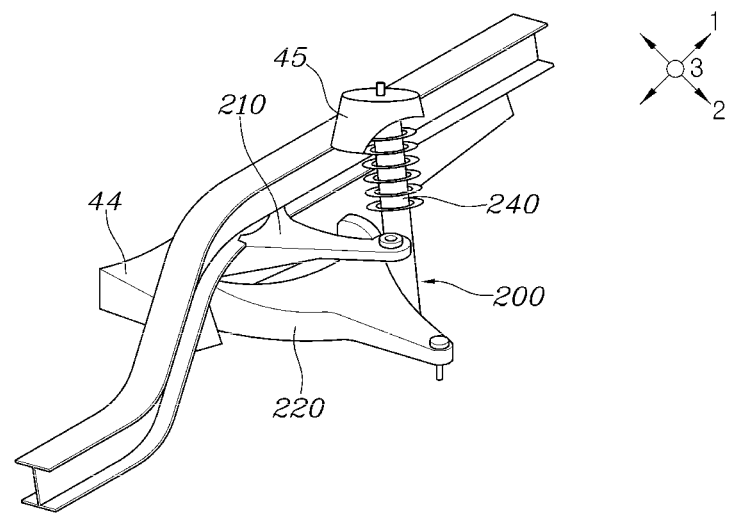
FIG. 5 is a perspective view illustrating a rear side member of a vehicle applied to a wishbone suspension according to an embodiment of the present disclosure.
Figure 6:
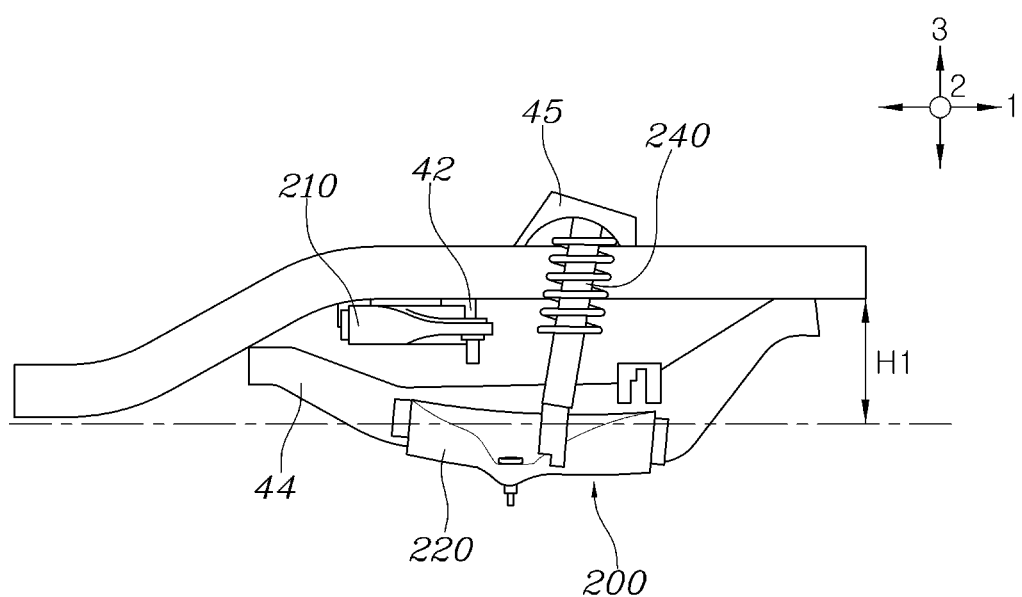
FIG. 6 is a side view illustrating a rear side member of a vehicle applied to a wishbone suspension according to an embodiment of the present disclosure.

FIG. 4 is a plan view illustrating the rear side member applied to a wishbone suspension according to an embodiment of the present disclosure, FIG. 5 is a perspective view illustrating the rear side member applied to the wishbone suspension according to the embodiment of the present disclosure, and FIG. 6 is a side view illustrating the rear side member applied to the wishbone suspension according to the embodiment of the present disclosure.

The following description is based on the structure of the rear side member described in FIGS. 1 to 3.

FIGS. 4 to 6 show that the rear side member according to the embodiment is formed in a curved shape passing both the first point 31 configured to engage with the first arm no of the first type suspension 100 and the second point 32 configured to engage with the second arm 210 of the second type suspension 200 such as to apply to the second type suspension 200 different from the first type suspension 100.

The second type suspension 200 may be a wishbone suspension, and in this case, the second arm 210 may be an upper arm.

The second point 32 may be located rearward of the first point 31 in the vehicle length direction, and accordingly, the wheel may be easily engaged when a suspension in which the coupling point with the wheel is disposed close to the coupling point with the side member collinearly in the vehicle width direction like a wishbone suspension is applied.

In addition, the second point 32 may be located inside of the first point 31 in the vehicle width direction. Accordingly, the length of the second arm may be secured to match the suspension in which the second arm 210 such as an upper arm is disposed in the vehicle width direction like a wishbone suspension.

In addition, a second bracket 42 for engaging with the second arm 210 may be assembled at the second point 32.

On the other hand, the second arm 210 may engage with the top or bottom of the second point 32.

In addition, when the second type suspension 200 is a wishbone suspension, the second arm 210, which is an upper arm, may have a wishbone shape and may be referred to as a double wishbone suspension. However, the shape of the second arm 210 is not limited thereto and may be implemented in a shape to which a link method or the like is applied.

On the other hand, the second type suspension 200 may include a strut 240, and the strut 240 may engage with at least one of the top, bottom, and side of the rear portion 20.

In addition, a lower arm 220 may be disposed at the bottom of the second arm 210.

A fourth bracket 44 for engaging with the lower arm 220 and a fifth bracket 45 for engaging with the strut 240 may be assembled in the rear portion 20.

Accordingly, the height difference Hi between the front portion 10 and the rear portion 20 may correspond to the height of the spring 120 of the first type suspension 100, but the strut 240 may easily engage with the rear side member through the fifth bracket 45.

The engagement is performed through the brackets 42, 44, 45 while the rear side member is shaped to correspond to the coupling position with the second type suspension 200 so that constraints on the shape required for the rear side member to engage with different types of suspensions may be eased.

According to the various embodiments of the present disclosure described above, the rear side member may have a shape that may engage with different types of suspensions, thereby improving the usefulness of the side member.

Accordingly, the cost of producing side members for each suspension type may be reduced and other parts coupled with the side member such as joints that are coupled with the upper body may be standardized for application.

Specific embodiments of the present disclosure have been illustrated and described above in detail, but it will be apparent to those skilled in the art that the disclosure may be improved upon and modified in various ways within the scope without departing from the technical spirit of the present disclosure as provided by the patent claims below.

What is claimed is:

1. A rear side member of a vehicle, the rear side member comprising:
    a front portion extending forward in a vehicle length direction;
    a rear portion extending rearward in the vehicle length direction and disposed offset to an inside of the vehicle with respect to the front portion; and
    a transition portion in a curved shape connecting a rear end of the front portion and a front end of the rear portion and passing through both a first point configured to engage with a first arm of a first type suspension and a second point configured to engage with a second arm of a second type suspension different from the first type suspension,
    wherein the front portion has a rectilinear shape.

2. The rear side member of claim 1, wherein the transition portion extends between the front portion and the rear portion, and wherein a first end connected to the rear end of the front portion and a second end connected to the front end of the rear portion are bent.

3. The rear side member of claim 1, further comprising a spring provided in the first type suspension, wherein a height difference between the front portion and the rear portion corresponds to a height of the spring.

4. The rear side member of claim 3, further comprising a spring seat disposed at a bottom of the rear portion.

5. The rear side member of claim 4, wherein the first type suspension is a coupled torsion beam axle suspension that includes a shock absorber configured to engage with a top, the bottom, or a side of the rear portion.

6. The rear side member of claim 3, wherein the second type suspension is a wishbone suspension that includes a strut configured to engage with a top, bottom, or side of the rear portion.

7. The rear side member of claim 1, further comprising:
    a first bracket assembled at the first point and configured to engage with the first arm; and
    a second bracket assembled at the second point and configured to engage with the second arm.

8. The rear side member of claim 7, wherein:
    the first type suspension is a coupled torsion beam axle (CTBA) suspension that includes a shock absorber; and
    a third bracket is assembled in the rear portion and configured to engage with the shock absorber.

9. The rear side member of claim 7, wherein:
    the second type suspension is a wishbone suspension that includes a lower arm and a strut;
    a fourth bracket is assembled in the rear portion and configured to engage with the lower arm; and
    a fifth bracket is assembled in the rear portion and configured to engage with the strut.

10. A rear side member of a vehicle, the rear side member comprising:
    a front portion extending forward in a vehicle length direction;
    a rear portion extending rearward in the vehicle length direction and disposed offset to an inside of the vehicle with respect to the front portion; and
    a transition portion in a curved shape connecting a rear end of the front portion and a front end of the rear portion and passing through both a first point configured to engage with a trailing arm of a coupled torsion beam axle suspension and a second point configured to engage with an upper arm of a wishbone suspension,
    wherein the front portion and the rear portion have a rectilinear shape.

11. The rear side member of claim 10, wherein the first point is located forward of the second point in the vehicle length direction.

12. The rear side member of claim 10, wherein the first point is located outside of the second point in a vehicle width direction.

13. The rear side member of claim 12, wherein the upper arm engages with a top or a bottom of the second point.

14. The rear side member of claim 10, wherein the upper arm has a wishbone shape.

15. A vehicle comprising:
    a vehicle body;
    a pair of rear side members coupled to opposite sides of the vehicle body in a vehicle width direction, wherein each of the rear side members comprises:
        a front portion extending forward in a vehicle length direction;
        a rear portion extending rearward in the vehicle length direction and disposed offset to an inside of the vehicle with respect to the front portion; and
        a transition portion in a curved shape connecting a rear end of the front portion and a front end of the rear portion and passing through both a first point configured to engage with a first arm of a first type suspension and a second point configured to engage with a second arm of a second type suspension different from the first type suspension,
    wherein the front portion and the rear portion have a rectilinear shape.

16. The vehicle of claim 15, wherein the transition portion extends between the front portion and the rear portion, and wherein a first end connected to the rear end of the front portion and a second end connected to the front end of the rear portion are bent.

17. The vehicle of claim 15, further comprising:
    a spring provided in the first type suspension, wherein a height difference between the front portion and the rear portion corresponds to a height of the spring; and
    a spring seat disposed at a bottom of the rear portion.

18. The vehicle of claim 15, wherein:
    the first type suspension is a coupled torsion beam axle suspension that includes a shock absorber; and
    the second type suspension is a wishbone suspension that includes a lower arm and a strut.

19. The vehicle of claim 18, further comprising:
    a first bracket assembled at the first point and configured to engage with the first arm;
    a second bracket assembled at the second point and configured to engage with the second arm;
    a third bracket assembled in the rear portion and configured to engage with the shock absorber;

a fourth bracket assembled in the rear portion and configured to engage with the lower arm; and a fifth bracket assembled in the rear portion and configured to engage with the strut.

\* \* \* \* \*